(12) United States Patent
DiChiara, Jr. et al.

(10) Patent No.: US 6,607,851 B2
(45) Date of Patent: Aug. 19, 2003

(54) MULTI-LAYER CERAMIC FIBER INSULATION TILE

(75) Inventors: Robert A. DiChiara, Jr., Carlsbad, CA (US); Franklin K. Myers, Beverly Hills, CA (US)

(73) Assignee: The Boeing Company, Seattle, WA (US)

( * ) Notice: Subject to any disclaimer, the term of this patent is extended or adjusted under 35 U.S.C. 154(b) by 0 days.

(21) Appl. No.: 10/055,337

(22) Filed: Oct. 26, 2001

(65) Prior Publication Data

US 2003/0082414 A1 May 1, 2003

(51) Int. Cl.$^7$ .................. B32B 19/00; B32B 17/12; B27N 9/00

(52) U.S. Cl. .............. 428/701; 428/293.4; 428/218; 428/920; 428/702; 244/121; 244/133; 244/158 A

(58) Field of Search ............... 428/292.1, 293.4, 428/212, 701, 702, 426, 428, 218, 920; 244/158 A, 158 R, 160, 121, 119, 120, 123, 124, 125, 126, 133

(56) References Cited

U.S. PATENT DOCUMENTS

| 3,953,646 A | 4/1976 | Fletcher et al. |
|---|---|---|
| 3,955,034 A | 5/1976 | Fletcher et al. |
| 4,124,732 A | 11/1978 | Leger |
| 4,338,368 A | 7/1982 | Dotts et al. |
| 4,456,208 A | 6/1984 | MacConochie et al. |
| 4,713,275 A | 12/1987 | Riccitiello et al. |
| 5,030,518 A | 7/1991 | Keller |
| 5,553,455 A | 9/1996 | Craig et al. |
| 5,560,569 A | 10/1996 | Schmidt |
| 6,086,664 A | * 7/2000 | Blohowiak et al. .... 106/287.16 |

FOREIGN PATENT DOCUMENTS

DE  3913-561 A  10/1990

* cited by examiner

Primary Examiner—Deborah Jones
Assistant Examiner—Gwendolyn Blackwell-Rudasill
(74) Attorney, Agent, or Firm—Alston & Bird LLP

(57) ABSTRACT

A multi-layer tile material produced from layers of alumina enhanced thermal barrier material having different densities. The insulation layers are bound together by a high strength, high temperature alumina or silica binder having a coefficient of thermal expansion similar to that of the insulation layers. Use of the multi-layered tile allows the problems of tile slumping and of insufficient heat management associated with low density alumina enhanced thermal barrier tile to be overcome.

19 Claims, 2 Drawing Sheets

US 6,607,851 B2

MULTI-LAYER CERAMIC FIBER INSULATION TILE

FIELD OF THE INVENTION

The present invention relates to ceramic fiber tile insulation components for the protection of a reusable launch vehicle such as the space shuttle.

BACKGROUND OF THE INVENTION

Reusable launch vehicles (RLVs), such as the space shuttle, repeatedly travel into or beyond the Earth's upper atmosphere and then return to the Earth's surface. During flight, the RLVs experience extreme temperatures, ranging from −250° F. while in orbit to nearly 2900° F. upon reentry to the atmosphere. Because of the extreme temperatures, the vehicle and its contents must be protected by a thermal protection system.

Thermal protection systems for RLVs are constructed from a large number, usually several thousand, of insulative tiles. The tiles function to insulate the vehicle from the environment and to radiate and reflect heat away from the vehicle. In addition to protecting the vehicle from environmental heat sources, the insulative tiles also provide protection from localized heating from the vehicle's main engines, rocket boosters, and directional thrusters.

A currently preferred insulative tile material is alumina enhanced thermal barrier, AETB. AETB is a rigid, three-component tile material comprising silica fibers, alumina fibers, and aluminoborosilicate fibers. AETB is a preferred insulative material because of its low thermal conductivity, low coefficient of thermal expansion, and its ability to receive reaction cured glass (RCG) and toughened unipiece fibrous insulation (TUFI) coatings, which further increase its insulative properties.

AETB is produced in densities ranging from about 8 lbs/ft$^3$ to about 20 lbs/ft$^3$, denominated AETB-8, AETB-20, etc. In general, lower densities of tile are preferred because they have lower thermal conductivity and tend to better insulate the vehicle. However, low density AETB cannot be used on vehicle surfaces which experience the hottest temperatures, those near 2900° F., due to the tendency of the low density tile to slump, or shrink, which requires replacement of the tile after use.

High temperature applications call for the use of high density AETB, such as 16 lbs/ft$^3$ or 20 lbs/ft$^3$, which is able to resist slumping but results in higher thermal conductivity and adds undesired weight to the vehicle.

What is needed is a material which has the exceptional thermal conductivity properties of AETB-8 and has the ability to withstand temperatures up to about 2900° F. without degradation.

SUMMARY OF THE INVENTION

A multi-layer alumina enhanced thermal barrier tile and method of making the tile are therefore provided that exhibit the high strength and high temperature durability of high density AETB tile while exhibiting the superior insulative properties of low density AETB. The invented multi-layer tile achieves the advantages of both high density and low density AETB by bonding a layer of the low density AETB to a layer of the high density AETB to form a unitary multi-layer tile material. When used on a reusable launch vehicle with the high density AETB layer facing the outer mold line, the high density AETB layer of the tile resists slumping in the high temperature environment while the low density AETB layer, facing the inner mold line, provides superior insulative properties without the need to endure extremely high temperatures that are absorbed by the high density layer. Use of a low density layer also advantageously reduces the overall weight of the tile.

The multi-layer tile material is produced from different density AETB materials which are produced by conventional methods. The insulation layers are bound together by a high strength, high temperature alumina or silica binder having a coefficient of thermal expansion similar to that of the insulation layers. Use of the multi-layered AETB tile allows the problems of tile slumping and of insufficient heat management to be overcome.

BRIEF DESCRIPTION OF THE DRAWINGS

Figure 1:
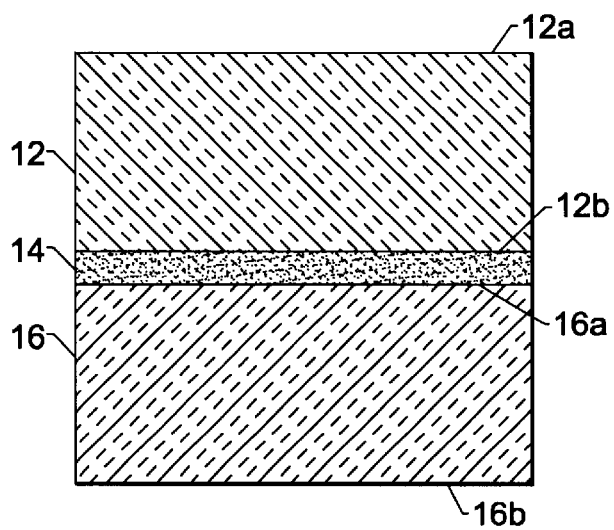

Having thus described the invention in general terms, reference will now be made to the accompanying drawings, which are not necessarily drawn to scale, and wherein:

FIG. 1 shows an embodiment of the multi-layer tile of the present invention.

Figure 2:
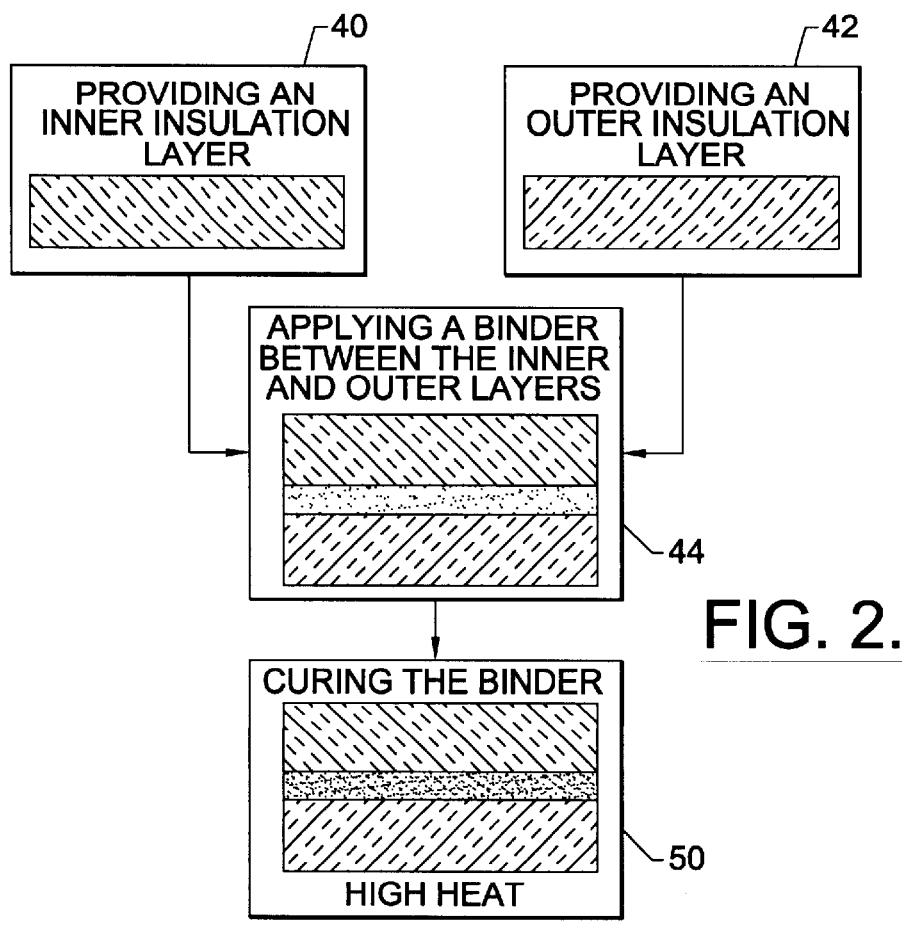

FIG. 2 shows a flowchart of an embodiment of a method of making the multi-layer tile of the present invention.

Figure 3:
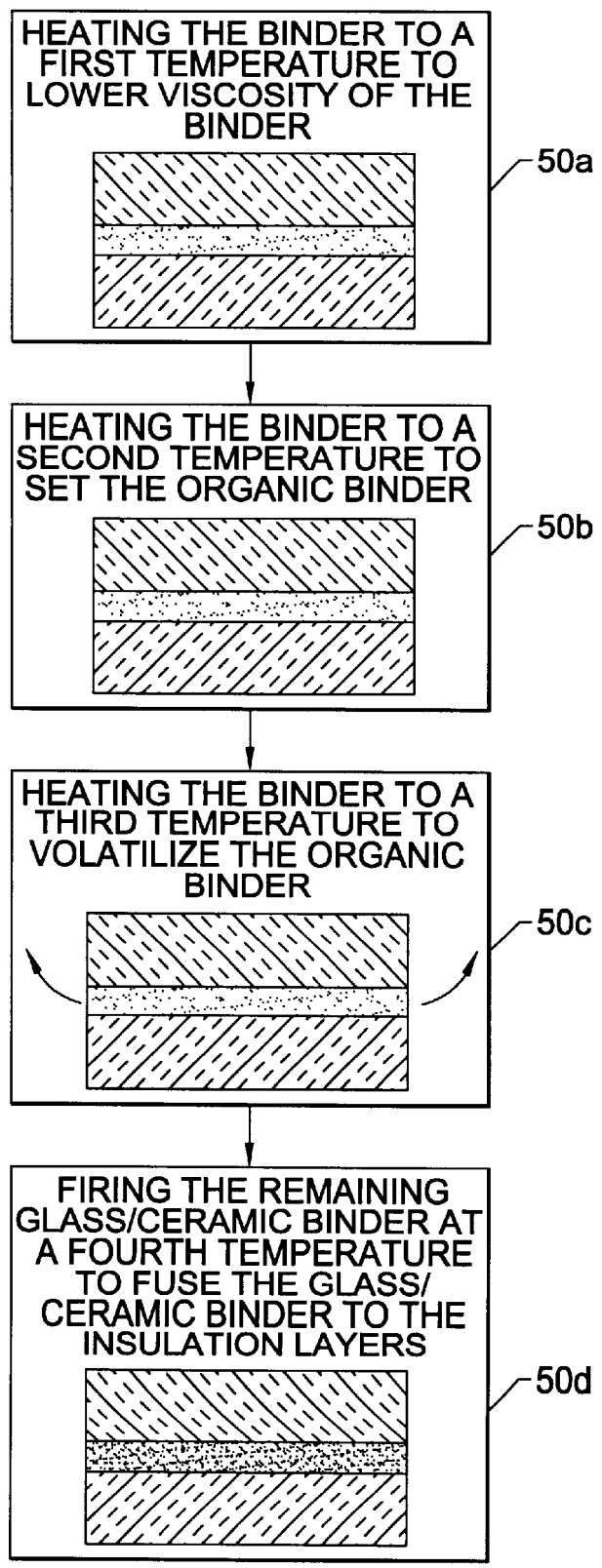

FIG. 3 shows a flowchart of an embodiment of a method of curing a binder layer within the multi-layer tile of the present invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Referring now to FIG. 1, the multi-layer tile material has an inner insulative layer 12, a binding layer 14, and a outer insulative layer 16. The inner insulative layer 12 has an average density and the outer insulative layer has an average density greater than that of the inner layer 12. In use, the inner low density layer 12 is attached to the surface of the RLV, or alternatively attached to a strain isolation pad (SIP) which also acts as an intermediate insulation layer, such as a Nomex™ felt, which is in turn attached to the surface of the RLV. The outer, high density layer 16 comprises part of the outer mold line of the RLV, with the surface of the outer layer 16b facing away from the vehicle.

Referring to FIG. 2, the multi-layer tiles are produced by supplying an inner, low density ceramic fiber insulation layer 40 and supplying an outer, high density ceramic fiber insulation layer 42. A layer of binder 44 is applied between the layers of insulation and the layers are placed in contact with one another. The binder is then heat cured 50, resulting in a binding layer that is fused to both the upper and lower layer of insulation.

As used throughout, the term low density layer shall mean a tile material having an average density of less than 10 lbs/ft$^3$. The term high density layer shall refer to a tile material having an average density of 16 lbs/ft$^3$ or greater. Tile material having a density of between 10 lbs/ft$^3$ and 16 lbs/ft$^3$ may be considered either low or high density tile.

Each multi-layer tile is produced to conform to a predetermined size and shape. For example, each tile on the outer surface of a reusable launch vehicle is designed to correspond to other tiles on the insulated surface so that no gaps occur between insulating tiles, and so that a smooth outer mold line is formed by the external surface of each tile. The composition and thickness of the insulation layers of each tile is determined by the temperatures to be endured by the tile during flight of the vehicle, which are determined predominantly by the location of the tile upon the vehicle's surface. The leading edge surfaces of the vehicle tend to experience the highest temperatures during flight.

AETB material is a three component composition comprising silica fibers, aluminoborosilicate fibers, and alumina fibers. The small diameter ceramic fibers are compacted and sintered together to form a light weight, porous insulative material. The AETB material may be produced in different densities, with the most commonly produced densities being 8 lbs/ft$^3$, 16 lbs/ft$^3$, and 20 lbs/ft$^3$. Information on the production of AETB material may be found in Leiser et al., "Options for Improving Rigidized Ceramic Heatshields", Ceramic Engineering and Science Proceedings, 6, No. 7–8, pp. 757–768 (1985) and Leiser et al., "Effect of Fiber Size and Composition on Mechanical and Thermal Properties of Low Density Ceramic Composite Insulation Materials", NASA CP 2357, pp. 231–244 (1984).

The blocks of sintered ceramic fiber insulation are easily machined and can therefore be made into a wide variety of shapes and thicknesses. The insulative layers of the multi-layer tile may be machined from the blocks of AETB insulation before or after being bound together by the binding material. If machined prior to binding, the low density tile 12 material is machined to its predetermined size and thickness with at least two opposing flat surfaces, one 12a for bonding to the inner mold line of the vehicle and another 12b for receiving application of the binding material and subsequent binding to the high density insulative layer. Likewise, the high density insulative layer 16 is machined to have an inner surface 16a corresponding to the outer surface of the low density insulative material, and an outer smooth, though not necessarily planar, surface 16b corresponding to the overall outer mold line of the vehicle.

Alternatively, the low density 12 and high density 16 layers of insulation may be bound together prior to machining. After binding, the sides of the tile that are roughly perpendicular to the bond line, the inner surface 12a of the low density layer, and the outer surface 16b of the high density layer may be machined to form a tile in accordance with predetermined size specifications.

The necessary thickness of each layer of the multi-layer insulation tile will depend on the heating profile of the tile, which is typically dependent upon the location of the tile on the vehicle. For instance, upon re-entry into the Earth's atmosphere, tiles on the leading edges and bottom surfaces of a vehicle are subjected to a much higher hearing profile than those areas located on the top central portions of the vehicle. Because lightweight tiles are preferred, the thickness of the high density insulation layer is preferably the minimal thickness capable of reducing thermal energy to that which may be endured by the low density layer of insulation without slumping.

The binders are chosen primarily based upon their coefficient of thermal expansion. Because the finished tiles are used in extreme temperature conditions, the materials used in the tile must have matching expansion characteristics in order to prevent physical stresses from developing within the material during thermal cycling. The AETB materials have extremely low coefficients of thermal expansion, typically $1.75 \times 10^{-6}$ to $1.95 \times 10^{-6}$ in/in from 77° F. to 1000° F., so a binder is needed that has a similarly low coefficient of expansion when cured.

Favorable binding properties, good thermal characteristics, and low coefficients of expansion are provided by silica, alumina, and glass binders, or combinations thereof. The silica, alumina, or glass binders are applied as particulates between the layers of AETB insulation. The layers are then held under slight pressure and fired to a temperature sufficient to fuse the binder to the surfaces of the insulation material.

Preferably, the insulation layers are bound together with a binder material that is a mixture of ceramic binder dispersed within a thermal setting organic binder. The ceramic binder may be glass, such as reaction cured glass (RCG), Ferro Corporation's EG0002, EG1001, and EG2790 electronic glasses, or ceramic, such as alumina and silica based binders. The organic binders are any thermosetting polymeric materials capable of bonding with the porous silica and alumina fiber material when heated. The organic binders include, but are not limited to, epoxies and acrylics.

Solvent is added to the organic binder and ceramic binder combination prior to application to the insulation layers to adjust the viscosity of the solution. A thin paste like solution is desired so that binder added to the insulation will generously wet the surfaces of the insulation but will not seep into the porous body of the insulation layer to a significant degree. Slight penetration of the binding material into the porous insulation layer provides for better adhesion with the binder, while over-penetration results in a heavier weight of binder material being used, which is undesirable.

An amount of binder is applied between insulation layers in an amount enough to generously wet both tile surfaces. The assembled tile system are then held in contact with one another throughout the subsequent heating and curing of the binder. Slight pressure may be applied and maintained upon the assembly by any of a number of ways known in laminate and composite fabrication, including but not limited to the use of a vacuum bag or simply placing a small weight upon the inner, uncoated surface of the inner insulation layer.

Referring to FIG. 3, the binder is cured by placing the assembly in an oven and slowly applying heat to the binder and insulation layers. As the temperature of the organic binder increases 50a, the viscosity of the organic binder decreases, and the organic binder flows into open pores on the surfaces of the insulation layers. The ceramic binder is a particulate material dispersed within the organic binder solution, so flow of the organic binder also transports the particulate ceramic binder material into the pores of the insulation layers. After the organic binder has been allowed to flow over the surface of the layers and permeate some of the porous structure of the layers, the temperature of the assembly is increased 50b to between 200° F. and 500° F., at which point the organic binder portion of the binding mixture sets and bonds the insulative layers to one another.

After the organic binding material sets, the assembly is moved into a furnace and heated to a temperature between 800° F. and 1000° F. for about an hour. At this temperature, the organic binding material breaks down and volatilizes 50c, after which the organic binding material and any remaining solvents escape from the assembly through the porous insulation layers. Elimination of the organic binder material lowers the overall weight of the tile assembly, and leaves only ceramic binding material, which has similar expansion and heat resistivity characteristics as the ceramic fiber tile material.

After elimination of the organic binding material, the assembly is heated to a range from about 1200° F. and 2400° F. The ceramic binder material has been evenly dispersed within the pores of the surfaces of the insulation by the flow of the organic binder, and the dispersed ceramic binding material fuses 50d to the silica and alumina fiber material of the insulation at these elevated temperatures. After the ceramic binder is fused, a strong, evenly distributed bond exists between the insulation layers.

Prior to application of the binding mixture to the surfaces of the insulation layers, a surface hardening agent is optionally applied and cured to those surfaces. Examples of surface hardening agents include silica sol and alumina sol. The surface hardening agent partially fills the voids in the surfaces of the insulation layers and limits the ability of the binder mixture wick into the porous insulation.

If silica sol is used, it preferably includes small silica particles from about 4 nm to about 150 nm in size. The silica particles are mixed with a carrier liquid, such as water with a small amount of ammonia such that the silica particles are present in an amount of from about 15 parts by weight to about 50 parts by weight of the mixture of silica and liquid, producing a mixture having the consistency of water. One operable silica sol of this type is commercially available as Nalco 2327 manufactured by Nalco Chemical Company. Curing takes place by heating the insulation and surface hardening agent to an elevated temperature of about 300° F. until the liquid carrier has completely evaporated. If further desired, a pore-obstructing material, such as cordierite or mullite, may be applied to the surfaces of the insulation layers prior to the application of the surface hardening agent in order to limit the depth to which the surface hardening agent penetrates the porous insulation layer.

After the layers of insulation have been bound together, the surface of the high density layer facing the outer mold line may be treated just as the outer surface of any unitary tile material. For instance, reaction cured glass (RCG) and toughened unipiece fibrous insulation (TUFI) coatings may be applied to the outer layer surface 16b of the multi-layer tile and exhibit the same effectiveness as when used with standard single layer tile.

EXAMPLES

By way of illustration and not for limitation, the following examples are provided in order to better explain the invention.

Example 1

Two small samples of AETB insulation tile having different densities were prepared, and a flat surface was machined on each sample.

A binding mixture was prepared using RCG glass composition composed of 95 wt % RCG glass and 7 wt % Methocellulose organic binding material. A denatured alcohol solvent was used to adjust viscosity.

A coating of the binding mixture was sprayed on the flat surfaces of each tile and the coated tiles were allowed to sit at room temperature for a period of 30 minutes. The two respective tiles were mated together. A small weighted object was placed upon the top surface of the top insulation layer in order to hold the top layer in intimate contact with the bottom layer.

The tile assembly was slowly heated to about 350° F. for a period of 30 minutes. The assembly was then moved to a furnace, where it was heated slowly to about 1000° F. At approximately 800° F., the heating rate was slowed such that the temperature was increased from 800° F. to 1000° F. over the period of an hour. The assembly was then heated from 1000° F. to 2225° F. and held at 2225° F. for a period of 90 minutes. The resulting assembly was firmly bonded together. Tensile tests revealed failure occurred within the body of the tile and not at bond joint, indicating a strong bond between the layers of insulation.

Example 2

Two small samples of AETB insulation tile having different densities were prepared, and a flat surface was machined on each sample.

A binding mixture was prepared using 95 wt % Ferro Electronic Glass EG0002, ceramic bonding material, and 5 wt % ethocellulose organic binding material. A butyl carbitol acetate solvent was used to adjust the viscosity of the bonding mixture to a medium paste.

A coating of the binding mixture was applied to the flat surfaces of each tile and the coated tiles were allowed to sit at room temperature for a period of 30 minutes. A second coating of the binding mixture was applied to the flat surfaces, and the flat surfaces of the two respective tiles were mated together. A small weighted object was placed upon the top surface of the top insulation layer in order to hold the top layer in intimate contact with the bottom layer.

The tile assembly was slowly heated to about 350° F. for a period of 30 minutes. The assembly was then moved to a furnace, where it was heated slowly to about 1000° F. At approximately 800° F., the heating rate was slowed such that the temperature was increased from 800° F. to 1000° F. over the period of an hour. The assembly was then heated from 1000° F. to 2400° F. and held at 2400° F. for a period of 20 minutes. The resulting assembly was firmly bonded together.

Example 3

Two small samples of AETB insulation tile having different densities were prepared, and a flat surface was machined on each sample.

A binding mixture was prepared using 90 wt % Ferro Electronic Glass EG0002 ceramic bonding material, and 10 wt % epoxy organic binding material. Acetone was used as a solvent to adjust the viscosity of the bonding mixture to a medium paste.

A coating of the binding mixture was applied to the flat surfaces, and the flat surfaces of the two respective tiles were mated together. The assembly was placed in a vacuum bag apparatus and a light vacuum was applied in order to hold the top layer in intimate contact with the bottom layer.

The tile assembly was slowly heated to about 350° F. for a period of 30 minutes. The assembly was removed from the vacuum bag and moved to a furnace, where it was heated slowly to about 1000° F. At approximately 800° F., the heating rate was slowed such that the temperature was increased from 800° F. to 1000° F. over the period of an hour. The assembly was then heated from 1000° F. to 2400° F. and held at 2400° F. for a period of 20 minutes. The resulting assembly was firmly bonded together.

Example 4

Two small samples of AETB insulation tile having different densities were prepared, and a flat surface was machined on each sample.

A thermal set ceramic binder called CO2 from Applied Polyeramic Inc. was used as the bonding agent. It consisted of silicon resin, alumina powder and a thermal set acrylic binder. The material consisted of about 75 wt % of alumina powder with 15 wt % silicone that on heating converted to silica. Acetone or alcohol was used as a solvent to adjust the viscosity of the bonding mixture to a medium paste.

A coating of the binding mixture was applied to the flat surfaces, and the flat surfaces of the two respective tiles were mated together. The assembly was placed in a vacuum bag apparatus and a light vacuum was applied in order to hold the top layer in intimate contact with the bottom layer.

The tile assembly was slowly heated to about 350° F. for a period of 30 minutes. This caused the thermal set acrylic to flow and thermally set the two assemblies together. The assembly was removed from the vacuum bag and moved to a furnace, where it was heated slowly to about 1000° F. At approximately 800° F., the heating rate was slowed such that the temperature was increased from 800° F. to 1000° F. over the period of an hour. The assembly was then heated from 1000° F. to 2000° F. and held at 2000° F. for a period of 20 minutes. The resulting assembly was firmly bonded together.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A multi-layer alumina enhanced thermal barrier tile comprising:
    an inner insulation layer having a first average density and composed of a combination of silica fibers, alumina fibers, and borosilicate fibers,
    a outer insulation layer having a second average density greater than said first average density and composed of a combination of silica fibers, alumina fibers, and borosilicate fibers, and
    a bonding layer disposed between and joining said inner and outer insulation layers.

2. The tile of claim 1, wherein the bonding layer is ceramic.

3. The tile of claim 2, wherein the bonding layer is selected from the group consisting of borosilicate glass, aluminum-barium silicate glass, and RCG Glass.

4. The tile of claim 2, wherein the bonding layer is selected from the group consisting of silica, alumina, or combinations thereof.

5. The tile of claim 1, wherein the bonding layer has a coefficient of thermal expansion within $0.5 \times 10^{-6}$ in/in of said first and said second insulation layers.

6. The tile of claim 1, wherein the first average density is about 8 lbs/ft$^3$ and the second average density is about 16 lbs/ft$^3$.

7. The tile of claim 1, wherein the first average density is about 8 lbs/ft$^3$ and the second average density is about 20 lbs/ft$^3$.

8. The tile of claim 1, wherein the coefficient of thermal expansion of the inner and outer layers are between about $1.75 \times 10^{-6}$ in/in to about $1.95 \times 10^{-6}$ in/in from 77° F. to 1000° F.

9. The tile of claim 1 further comprising a layer of reaction cured glass (RCG) upon said outer insulation layer opposite of said bonding layer.

10. The tile of claim 9 further comprising a layer of toughened unipiece fibrous insulation (TUFI) in conjunction with the layer of RCG.

11. A multi-layer silica fiber insulation tile comprising:
    an inner alumina enhanced thermal barrier layer having a first average density
    an outer alumina enhanced thermal barrier layer having a second average density greater than said first average density, and
    a bonding layer disposed between and joining the inner layer and outer layer.

12. A multi-layer alumina enhanced thermal barrier tile comprising:
    an inner insulation layer having a first average density and composed of a combination of silica, alumina, and borosilicate fibers,
    a outer insulation layer having a second average density greater than said first average density and composed of a combination of silica, alumina, and borosilicate fibers, and
    a ceramic bonding layer joining said inner and outer insulation layers.

13. The tile of claim 12, the ceramic bonding layer is selected from the group consisting of silica, alumina, or combinations thereof.

14. The tile of claim 12, wherein the ceramic bonding layer has a coefficient of thermal expansion within $0.5 \times 10^{-6}$ in/in of said first and said second insulation layers.

15. The tile of claim 12, wherein the coefficient of thermal expansion of the inner and outer layers are between about $1.75 \times 10^{-6}$ in/in to about $1.95 \times 10^{-6}$ in/in from 77° F. to 1000° F.

16. The tile of claim 12, further comprising a layer of reaction cured glass (RCG) upon said outer insulation layer opposite of said bonding layer.

17. The tile of claim 16, further comprising a layer of toughened unipiece fibrous insulation (TUFI) in conjunction with the layer of RCG.

18. A multi-layer alumina enhanced thermal barrier tile comprising:
    an inner insulation layer having a first average density and composed of a combination of silica, alumina, and borosilicate fibers,
    an outer insulation layer having a second average density greater than said first average density and composed of a combination of silica, alumina, and borosilicate fibers,
    a bonding layer joining said inner and outer insulation layers, and
    a layer of reaction cured glass (RCG) upon said outer insulation layer opposite of said bonding layer.

19. The tile of claim 18, further comprising a layer of toughened unipiece fibrous insulation (TUFI) in conjunction with the layer of RCG.

* * * * *

UNITED STATES PATENT AND TRADEMARK OFFICE
CERTIFICATE OF CORRECTION

PATENT NO. : 6,607,851 B2
DATED : August 19, 2003
INVENTOR(S) : DiChiara, Jr. et al.

It is certified that error appears in the above-identified patent and that said Letters Patent is hereby corrected as shown below:

Column 8,
Line 28, after "claim 12," insert -- wherein --.

Signed and Sealed this

Tenth Day of February, 2004

JON W. DUDAS
*Acting Director of the United States Patent and Trademark Office*